United States Patent
Mittnight

[11] Patent Number: 5,996,479
[45] Date of Patent: Dec. 7, 1999

[54] CUTTING BOARD WITH AIR DIRECTING MEMBER

[76] Inventor: Thomas Mittnight, 12 A Atlantic Oaks Cir., St. Augusta, Fla. 32084

[21] Appl. No.: 08/874,192

[22] Filed: Apr. 15, 1997

Related U.S. Application Data

[63] Continuation-in-part of application No. 08/585,563, Jan. 6, 1996, abandoned.
[51] Int. Cl.[6] .............................. A47J 47/00; E04H 15/02; E04H 15/36
[52] U.S. Cl. ............................ 99/467; 99/485; 99/646 R; 269/289 R; 269/302.1
[58] Field of Search ......................... 99/467, 485, 646 R; 269/289 R, 302.1; 126/300, 299 D, 299 R

[56] References Cited

U.S. PATENT DOCUMENTS 4,411,254 10/1983 Field et al. ............................ 126/300
5,311,813 5/1994 Fairbanks et al. ..................... 99/646 R Primary Examiner—Reginald L. Alexander
Attorney, Agent, or Firm—John P. Halvonik

[57] ABSTRACT

An improved cutting board having a fan or similar member for drawing air across the surface of the cutting board. A housing at one side of the board contains a fan in connection with an air filter that removes airborne particles commonly associated with foods. There is another housing beneath the board that directs air back out of the lower housing and across the cutting surface. Exit passages in the side walls of the lower housing aid proper circulation of the air. A second embodiment includes the lower housing in connection with the cutting surface. The lower housing contains an air drawing member such as a fan, that is used to draw air from apertures in the cutting surface. These apertures surround the cutting surface drawing downward removing airborne particles and create a passage in connection with the lower housing. Exit passages in the side walls of the lower compartment provide a passage for the exit of air from the cutting board.

9 Claims, 2 Drawing Sheets

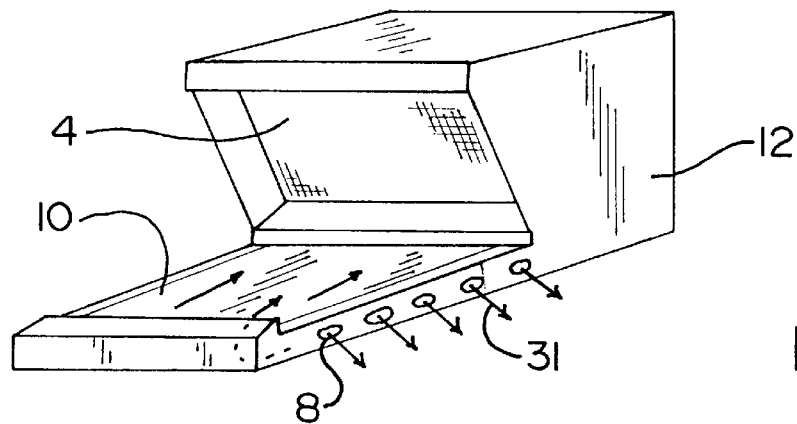
FIG. 1
FIG. 2
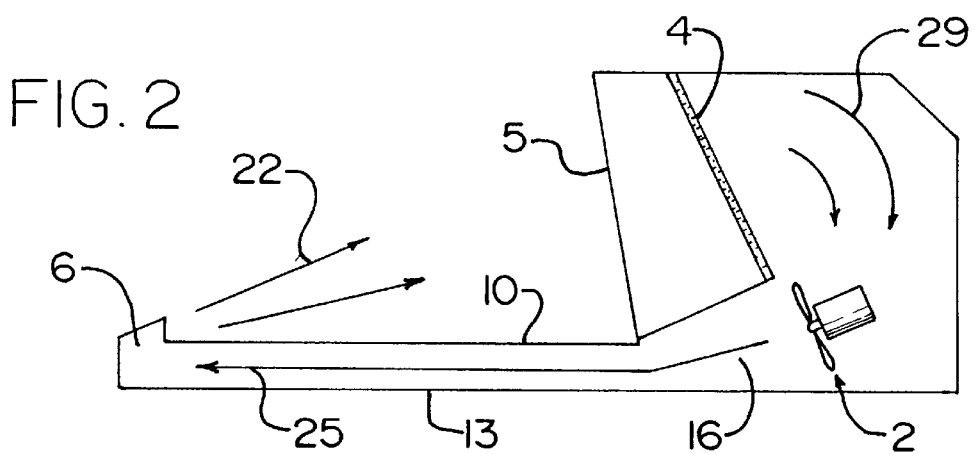
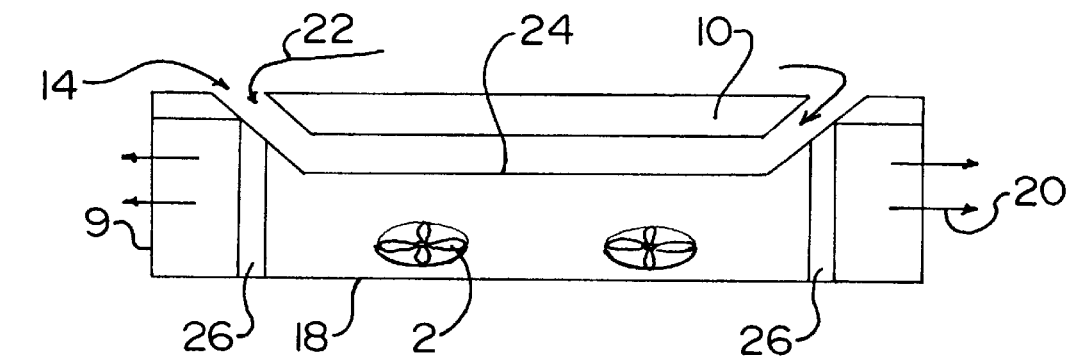
FIG. 3

ND,479

CUTTING BOARD WITH AIR DIRECTING MEMBER

This application is a continuation in part of U.S. Ser. No. 08/585,563 filed Jan. 6, 1996, now abandoned.

SUMMARY OF THE INVENTION

There are two embodiments described herein. The first embodiment has a flat cutting surface in connection with a lateral housing connected to one side of the cutting surface. The lateral housing supports a fan or similar means for drawing air. There is a passage in the front wall of the lateral housing that provides an opening for drawing air across the cutting surface by virtue of the fan. This front passage may contain an air filter designed to remove airborne particles that are commonly associated with onions and other foods. The lower part of the lateral housing is in connection with a lower housing that lies beneath the cutting board. There is an air passage at the other end of the lower housing that is in connection with an air director that directs air back out of the lower housing and across the cutting surface so that air circulates continuously over the cutting board and through the housings. Exit passages in the side walls of the lower housing do several things including: reducing the amount of air that is fed back across the cutting surface; providing a source of fresh air to be drawn across the board and also help to remove the airborne particles a s they are drawn across the cutting surface.

A second embodiment includes a lower housing in connection with the cutting surface. The lower housing contains an air drawing means such as a fan, that is used to draw air from apertures in the cutting surface. These apertures surround the cutting surface drawing downward removing airborne particles so as to create at least one passage in connection with the lower housing. Exit passages in the side walls of the lower compartment provide a passage for the exit of air from the cutting board. Lower compartment may contain an air filter designed to remove airborne particles that are commonly associated with onions and other foods.

It is an object of the invention to provide a means for removing or alleviating air borne particles associated with the cutting of foods such as onions.

Other objectives will become known once the invention is shown and described.

DESCRIPTION OF DRAWINGS

FIG. 1 Front view of first embodiment;

FIG. 2 Side view of first embodiment;

FIG. 3 Side view of second embodiment;

DESCRIPTION OF THE PREFERRED EMBODIMENT

Figure 4:
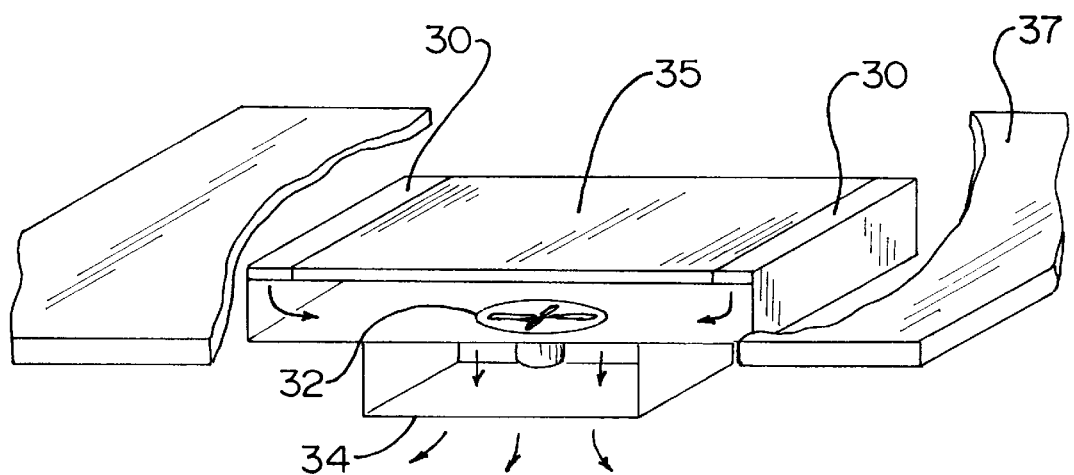
FIG. 4 side view of permanently installed version.

The overall construction of the first embodiment is shown in FIG. 1. There is a lateral housing 12 that supports a fan 2 or other means for drawing air at one side of the cutting board. It is preferred that a filter 4 be used in connection with that side 5 of the lateral chamber that is facing the cutting surface 10. Such a filter may comprise a charcoal absorbent or similar material that will have good effect on removing airborne particles such as those found in the cutting of onions. The fan will draw air across the cutting surface, see arrow 27, and through the filter thus removing air borne particles associated with the cutting of foods such as onions.

The lateral housing has an air passage 16 in the bottom of the housing so as to fluidly connect the lateral housing with a second housing, the bottom housing, located directly below the cutting surface. See air flow arrow 25. The bottom housing 18 may be about the same length and width of the cutting surface so that it may be said to lie roughly under the cutting surface. That passage in connection with the lateral housing may be referred to as the "first" passage in the bottom housing. There is a second air passage located at that end of the bottom housing that is opposite the first passage. This second passage contains an air directing means 6 that will direct the air from out of the lower housing and back out across the surface of the cutting surface, see arrow 27. Thus the flow of air in this system is roughly circular, see arrows 25, 27, 29 and the flow of air is continuous being across the cutting board and back through each of the housings.

In addition to the first and second passages, there are secondary air passageways 8 in the sides of the bottom housing 18 in order to provide a secondary movement of air through the system, see arrows 31. The use of these secondary air passages also helps to minimize that flow of air back out across the board. Without them, the flow of air would be relatively stronger and more likely to bounce off the filter in the lateral housing and so direct airborne particles back at the person who is cutting on the board. The secondary passages may also help to take some of the air borne particles out of the flow of air, although it is believed that the air filter will be the primary means of achieving this.

In the second embodiment shown in FIG. 3, the lateral housing is not needed and the only housing is the lower compartment 18, below the cutting board 10. There is a fan 2 or other means for drawing air that is housed in the lower housing and that draws air through passage(s) 14 located in and around the surface of the cutting board. The passages in the cutting board fluidly connect the surface of the cutting board with the upper wall 24 of the lower housing. The upper wall of the lower chamber may be the under surface of the cutting board itself or may be a separate wall as shown in FIG. 3.

The fan in the lower housing will draw air from around the cutting surface, creating a vortex-like action and thus draw air into the lower passage. The air then exits from exit passages 9 that are located in the side walls of the lower compartment. Such side walls may be any of those four walls of the lower compartment that are located at the side of the lower compartment and are perpendicular to the cutting surface. A filter means should be used in connection with the lower housing. Such a filter may be in connection with the side walls 4 of the lower housing or in the top 24 of the housing.

It is thought that this second version would preferably have intake passages 14 located near at least two sides of the cutting board so that air will be drawn in two directions across the cutting board. Air filters may be located in both the upper wall 24 and the side wall 26 of the lower housing. At least one air filter should be used in connection with the lower housing.

FIG. 4 shows a permantently installed version of the cutting board that is built as part of a kitchen counter top. A air intake ports 30 are located at the sides of the board and a fan 32 or similar means for drawing air draws the air through the ports. A filter 34 filters the air before it is exhausted at a point beneath the counter top. Arrows show the direction of air flow. 35 is the cutting surface. 37 is counter top.

The dimensions of the unit may vary with the air intake port preferably about 1.5" in width. The length may be about 12" and the filter area about 12" by 12". Air intake and board would be somewhat flush with counter top.

Figure 5:
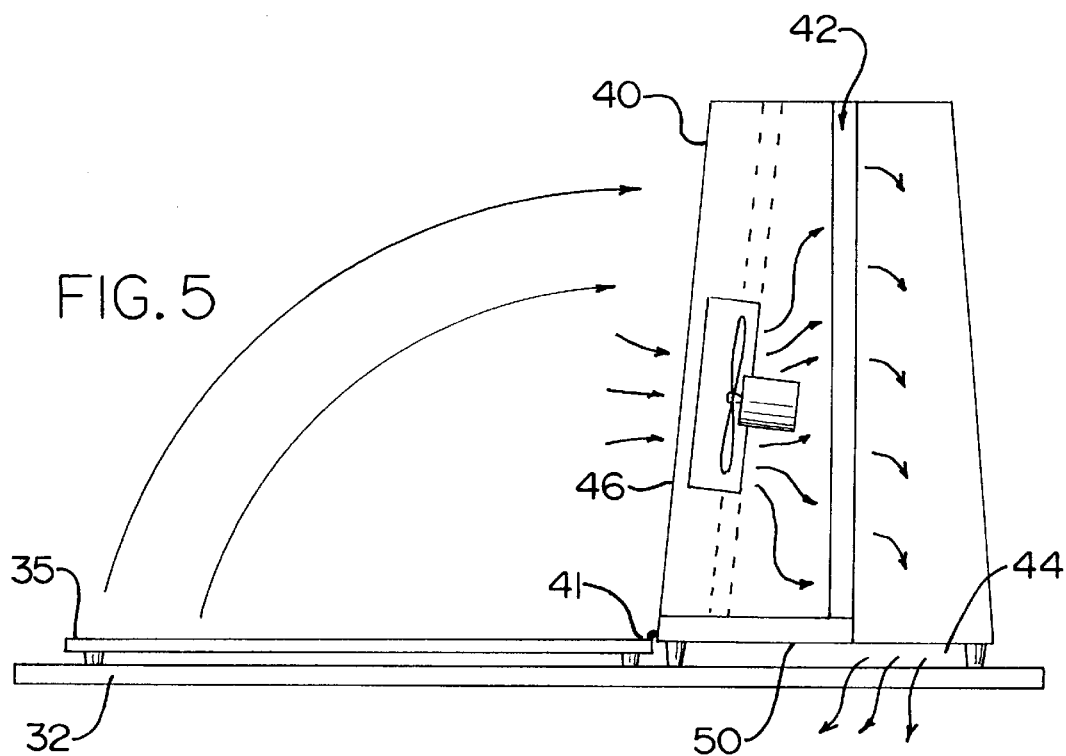
FIG. 5 side view of portable version.

FIG. 5 shows optional portable version having a pivotal connection between the cutting surface 35 and the housing 40 that contains the fan 46 and filter 42. The cutting surface can be folded closed against the housing when not in use (See arrow). A fan 46 or a similar means for drawing air is used to draw air across the cutting board and into the filter area 42. The bottom portion 50 of the housing that holds the fan should be closed. Openings in the bottom of the housing at 44 may be used to direct the air downward after coming in contact with the filter. There may be a hinge or similar means at 41 that connects the cutting surface with the housing in order to allow the pivoting action. Arrows show direction of air. Dimensions are not crucial to the performance but it is suggested that the housing be about 5" thick when seen in side view FIG. 5 and about 11" tall. The cutting surface may have an area of 12" by 12". The thickness of the cutting area may vary.

The cutting surface in both embodiments may be any state of the art cutting surfaces that are known in the field. Materials such as wood, hard plastics, among others, are believed to be suitable for such purposes.

It believed that a fan or similar means used in connection with the cutting board should draw at a rate of 120–150 cubic feet per minute in order to draw air across the cutting board at an optimal rate. It is believed that the permanent version would have preferred intake rate of about 150 cubic feet per minute and the portable version about 120 cubic feet per minute. This rate may be varied by trial and error determinations.

I claim

1. An improved cutting board comprising; a flat cutting surface having an under surface, a top surface and four side edges; a housing in connection with one of said side edges, said housing having a means for drawing air across said cutting surface, said housing having an open front wall, a rear wall, two side walls and a bottom wall so as to form an enclosed compartment about said air drawing means, said bottom wall having an air passage in connection with said housing; wherein air is drawn across said cutting surface through said open front wall of said housing and discharged therefrom through said air passage.

2. The apparatus of claim 1 wherein said means for drawing air comprises a fan.

3. The apparatus of claim 2 wherein said housing has a means for filtering air.

4. The apparatus of claim 3 having a means for directing air across said cutting surface said means for directing air having an air passage in connection with said under surface and having an air deflector means in connection with one of said side edges.

5. The apparatus of claim 3 wherein said housing is in pivotal connection with said side edge.

6. An improved cutting board and counter top comprising: a flat cutting surface in connection with the counter top and having an under surface, a top surface and four side edges, a lower housing in connection with said under surface and having a front wall, a rear wall, two side walls and a bottom wall so as to form an enclosed compartment; at least one air intake passage in connection with one of said side edges and said housing so as to create an air passage between said cutting surface and said housing; said housing having a means for drawing air through said air intake passage; an air exit passage in connection with one of said housing walls for the exit of air, an air filter means in connection with said housing and placed so that said flow of air will pass through said air filter means prior to exiting.

7. The apparatus of claim 6 wherein said means for drawing air comprises a fan.

8. The apparatus of claim 7 wherein said air exit passage is in connection with said bottom wall of said housing.

9. The apparatus of claim 7 wherein said air exit passage is in connection with one of said side walls of said housing.

\* \* \* \* \*